March 8, 1960
B. ROUBAN
2,927,764
SEMI-AUTOMATIC WEIGHT MAKE-UP DEVICE FOR WEIGHING
PULVERULENT OR FINE GRANULOUS PRODUCTS
Filed April 15, 1958
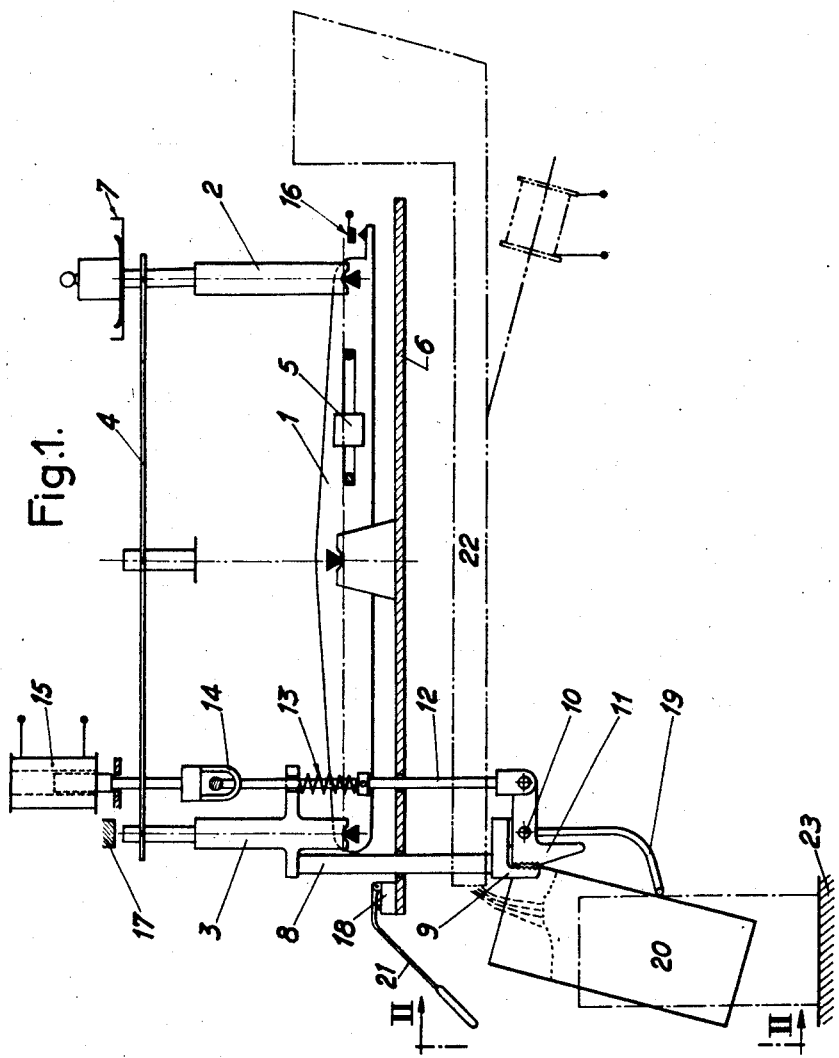
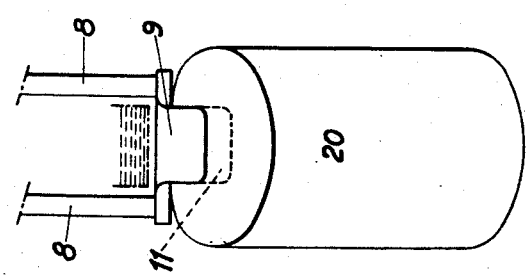

United States Patent Office 2,927,764
Patented Mar. 8, 1960

2,927,764

SEMI-AUTOMATIC WEIGHT MAKE-UP DEVICE FOR WEIGHING PULVERULENT OR FINE GRANULOUS PRODUCTS

Basile Rouban, Clamart, France, assignor to Societe Anonyme dite: Les Successeurs de B. Trayvou, La Mulatiere, France Application April 15, 1958, Serial No. 728,690

Claims priority, application France April 19, 1957

2 Claims. (Cl. 249—60)

This invention relates to weighing devices or instruments and has specific reference to means for making-up the weight of pulverulent or fine granular products in weighing instruments.

It is known that most pulverulent products when poured tend to diffuse themselves in the surrounding space, and that an efficient ramming or like action must be provided in order to spare the material of which the containers are made. The best filling and ramming device up to now known is the Archimedean screw. However, the precision of the filling action of devices based on this principle is unreliable and in most cases it is necessary, for keeping within the limits set by the weights and measures department or like official organism, to fill the containers with these devices below the desired weight and subsequently make up exactly the desired quantity. In the method now conventional in nearly all circumstances this last-mentioned operation is effected by hand.

It is the object of this invention to reduce this make-up operation to a simple and single act of the operator by the use of a semi-automatic device delivering the make-up weight of product in a container filled beforehand just under the desired weight by means of a feeder controlled by a Roberval-type scale.

In this feeder the vertical rod of the scale which is opposite to the rod carrying the measuring weights is formed at its lower end with a jaw having hingedly mounted thereon another coöperating jaw controlled for oscillation relative to the first jaw by a link normally urged in the jaw-closing direction by a spring and responsive to the action of an electromagnet, so that when the electromagnet is energized the link is pulled and the jaws opened against the resistance of said spring.

In order to afford a clearer understanding of this invention and of the manner in which the same may be carried out in the practice, reference will now be made to the accompanying drawings forming part of this specification and illustrating diagrammatically by way of example a typical form of embodiment of the invention. In the drawing:

Figure 1 is a diagrammatical complete view of the weighing assembly; and

Figure 2 is a fragmentary view showing on a larger scale a container ready to receive the weight make-up, as seen in the direction of the arrows II—II of Fig. 1.

The device according to this invention comprises a scale for example and preferably of the Roberval type, mounted on a base plate 6 and provided with a beam 1, two vertical rods 2, 3 and a parallelogram-forming complementary beam 4 adapted, as already known, to maintain the rods 2, 3 in a vertical position.

The rod 2 carries on its upper end a pan 7 adapted to receive the weight of the quantity to be metered together with the tare of the container. The other rod 3 is formed with a rigid depending extension in the form of a strap 8 carrying at its lower end a jaw 9. This jaw 9 has pivotally mounted thereon through a pivot pin 10 another jaw 11. This other jaw 11 is pivotally attached to a link 12 urged by a spring 13 in the direction to close the clamp formed by the two jaws 9 and 11. This clamp may be opened by pulling upwards a ring or strap 14 secured to the core or plunger of an electromagnet 15 and engaging the hook-shaped upper end of the link 12.

During the weighing operation and as shown in the drawing, the ring 14 does not contact the link 12 and the jaws 10, 11 are clamped or closed by the spring 13. When the scale attains a position of equilibrium an electric contact 16 is closed, the movable element of this contact being carried by the beam 1.

This device may comprise, as already known, a compensating device consisting of a weight 5 mounted for axial sliding movement on a graduated rod carried by the beam 1. The function of this compensating device is to compensate the weight of the product still falling when the end of the weighing operation is controlled by the contact 16.

The device described hereinabove operates as follows:

In the inoperative position the electromagnet 15 is energized and the clamp consisting of the pair of jaws 9 and 11 is open. The rod 3 is caused to engage the upper stop 17 on the one hand by the measuring weight carried by the pan 7, and also on the other hand by the energization of the electromagnet 15. The container 20 filled beforehand with the product by volumetric gauging is then presented in a position whereby its rear upper edge is engaged between the jaws 9 and 11. The operator may then close the contact 18 by actuating manually the hand lever 21 with the same act accomplishing the insertion of the container in the jaws, thereby opening the electrical circuit feeding the electromagnet 15; thus, the spring 13 applies the jaw 11 against the other jaw 9 and the container is thus clamped between the two jaws.

A guide member 19 carried by the jaw 11 maintains the container in an adequate position. A feeder 22 illustrated diagrammatically in the form of a vibrator pours the product into the container. When the desired quantity is poured, the scale reaches its position of equilibrium and the contact 16 is closed. This closing of the contact 16 stops the feeder and re-energizes the electromagnet 15.

The clamp 11, 9 is thus opened and the container filled and provided with the make-up weight of product is laid automatically by gravity on a travelling band or like conveyor 23.

With this semi-automatic device the only thing the operator entrusted with the make-up weighing has to do is simply to successively present the previously volumetrically filled containers to the jaws 11, 9, for the pouring of the make-up quantity and the releasing of the correctly filled container are accomplished automatically by the device itself.

Moreover, the use of the device of this invention, in combination as suggested hereabove with means for delivering volumetric quantities of the product to be weighed provides considerable advantages in comparison with the use of automatic weighing devices.

The pre-gauged quantity of product may be delivered very rapidly and at a considerable rate, without checking its accuracy, since this pre-gauging step is followed by a finishing weighing step.

The delivery of the desired quantity of product may be effected very easily with a high degree of accuracy since the moderate value of the make-up quantity permits a quick delivery of this make-up quantity at a very reduced rate.

Moreover, the device is easily applicable to the use of containers having no inherent rigidity, such as plastic or fabric containers. In this case, the jaw 9 should preferably comprise a relatively wide portion shaped to conform to the contour of curvature of the edge of the filled container to be gripped. After the edge of the container has been inserted between the jaws 11, 9, the container bears on the guide member 19, and due to the force of gravity and to the mechanical pull resulting therefrom the whole of the upper edge of this container will form a relatively wide aperture under the distributor outlet.

In certain cases and notably in the case mentioned hereabove concerning the use of containers having no inherent rigidity, it may be advantageous to substitute for the discharge travelling band 23 illustrated in the drawing a pair of travelling bands forming a V with each other by angularly shifting these bands by 90 degrees to each other, these bands being furthermore slightly inclined separately with a small angle the one relative to the horizontal and the other relative to the vertical.

What I claim is:

1. A semi-automatic device for delivering a make-up quantity of a product in a container having an upper, substantially circular edge and being partially filled with a weight of the product which is slightly inferior to the desired final weight of product to be packaged and notably in such a container having a poor self-rigidity, which comprises a feeder, electric means controlling the pouring of the product by said feeder, a scale structure having a beam, a vertical rod mounted on said scale beam and adapted to carry the loaded container and another vertical rod mounted on said scale beam and adapted to carry measuring weights, a jaw rigidly secured under said first vertical rod, another jaw hingedly attached to said first jaw, said other jaw carrying a guide member, resilient means urging said other jaw towards said first jaw, electromagnetic means adapted, when energized, to move said jaws away from each other against the resistance of said resilient means, manually controlled means operable subsequent to the engagement of the upper rim of the partially filled container between said jaws, for de-energizing said electromagnetic means, thus causing the partially filled container to be suspended beneath the feeder by having its upper edge gripped between the two jaws and to lean on the guide member in a stable position slightly inclined to the vertical, said manually controlled means simultaneously energizing said electric means, thus causing the feeder to pour make-up product into said container, a travelling band arranged beneath the container, and means responsive to the movements of said beam, said last-mentioned means releasing said electric means and energizing said electromagnetic means when said feeder has completed the desired final weight in said container, thus causing the pouring of the product to be discontinued and the completely filled container to drop by gravity onto said travelling band.

2. A semi-automatic device for delivering a make-up quantity of a product in a container having an upper, substantially circular edge and being partially filled with a weight of the product which is slightly inferior to the desired final weight of product to be packaged and notably in such a container having a poor self-rigidity, which comprises a feeder, electric means controlling the pouring of the product by said feeder, a scale structure having a beam, a vertical rod mounted on said scale beam and adapted to carry said loaded container and another vertical rod mounted on said scale beam and adapted to carry measuring weights, a jaw rigidly secured under the first vertical rod, said jaw being formed with a relatively large zone shaped to conform to the upper edge of the partially filled container, another jaw, said other jaw carrying a guide member, resilient means urging said other jaw towards said first jaw, electromagnetic means adapted, when energized, to move said jaws away from each other against the resistance of said resilient means, manually controlled means operable subsequent to the engagement of the upper rim of the partially filled container between said jaws for de-energizing said electromagnetic means, thus causing the partially filled container to be suspended beneath the feeder by having its upper edge gripped between said two jaws and to lean on the guide member in a stable position slightly inclined to the vertical, the relatively large area of said first jaw opening widely the upper edge of the container under the feeder, said manually controlled means simultaneously energizing said electric means, thus causing said feeder to pour make-up product into said container, a travelling band arranged beneath the container, and means responsive to the movement of said beam, said last-mentioned means releasing said electric means and energizing said electromagnetic means when said feeder has perfected the desired final weight in said container, thus causing the pouring of the product to be discontinued and the completely filled container to drop by gravity onto said travelling band.

References Cited in the file of this patent

UNITED STATES PATENTS

| | | |
|---|---|---|
| 1,037,824 | Fasting | Sept. 3, 1912 |
| 1,696,952 | Hartman | Jan. 1, 1929 |
| 1,777,227 | Roth | Sept. 30, 1930 |
| 2,546,193 | Lindstaedt | Mar. 27, 1951 |